May 22, 1923.　　　　　　　　　　　　　　1,455,993
P. J. CONWAY
NECKLACE FASTENING DEVICE
Filed June 30, 1922
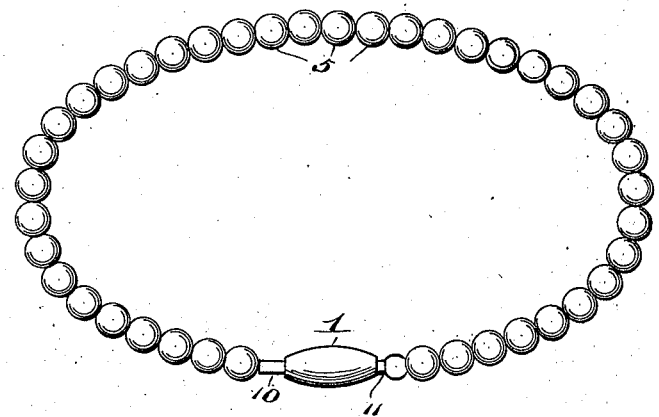
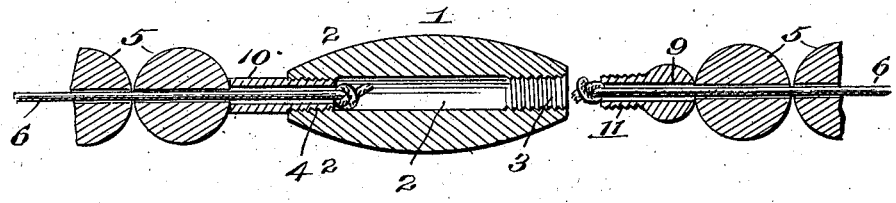
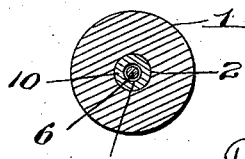
Patrick Joseph Conway
Inventor
By　Henry W. Driscoll　Atty Patented May 22, 1923.

1,455,993

UNITED STATES PATENT OFFICE.

PATRICK JOSEPH CONWAY, OF PROVIDENCE, RHODE ISLAND.

NECKLACE-FASTENING DEVICE.

Application filed June 30, 1922. Serial No. 571,978.

*To all whom it may concern:*

Be it known that I, PATRICK J. CONWAY, citizen of the United States, residing at Providence, in the county of Providence and State of Rhode Island, have invented a certain new and useful Necklace-Fastening Device, of which the following is a specification.

The present invention relates to certain new and useful improvements in fastening devices for necklaces.

The object of the invention is to provide a fastening or connecting device of simple and cheap construction, which is easily applied and released, and which is of symmetrical and pleasing external appearance and has no sharp edges or projections to catch or tear the clothing, and is secure from strain in wear.

With these and other objects in view, one modification of the invention is set forth on the accompanying drawing, in which:

Fig. 1 is a plan of the assembled fastening device as applied to a string of beads.

Fig. 2 is a longitudinal section through the fastening device, with one sleeve unscrewed.

Fig. 3 is a cross-section on line 3—3 of Fig. 2.

The device is composed of a body 1 of any suitable material such as gold or other precious metal, solid or plated, and may have desired engraving or other ornamentation on its outer surface. This body has a bore 2 extending lengthwise, which is tapped at either end to provide female screw threads 3 and 4.

The beads or pearls 5 are strung on the usual cord 6. The ends of this cord, which are to be joined by this fastening device, are strung through sleeves 9 and 10, and are then tied. This method of connection assures the sleeve a sufficient swiveling or twisting movement about the cord to permit assembly.

The sleeves 9 and 10 have an external screw thread 11 at one end, to mate with the internal threads 3 and 4.

The device is assembled by screwing the sleeves 9 and 10 into the body 1. If desired, one sleeve may then be permanently secured in the body 1 by crushing the body and the sleeve until they are no longer circular in section, or by other suitable means, to prevent unscrewing. The knots in the cord are inside the body 1 and do not detract from the appearance of the device.

It is to be understood that while the drawings present a preferred modification, the formation and assembling may be varied by means well known in the art.

What is claimed is:—

1. In a fastening device, a tubular body, sleeves adapted to screw into said body, said sleeves being hollow to receive the ends of a necklace cord so that the cord may be tied by the respective ends on the inside thereof.

2. In a fastening device for fastening together the ends of a cord, a tubular body, hollow sleeves adapted to screw into said body, said sleeves embracing the ends of the cord and secured thereon.

3. In a device for fastening together the ends of a cord, a body, internal screw threads in said body, sleeves embracing the ends of said cord and secured thereto with permissive swiveling movement thereon, external threads on said sleeves, said internal and external threads adapted to assemble said body and said sleeves.

In testimony whereof, I affix my signature, in the presence of two witnesses.

PATRICK JOSEPH CONWAY.

Witnesses:
HENRY R. SULLIVAN,
HELEN C. FLYNN.